(12) United States Patent
Zunino et al.

(10) Patent No.: US 8,827,228 B2
(45) Date of Patent: Sep. 9, 2014

(54) FASTENER DEVICE, A SEAT PROVIDED WITH SAID DEVICE, AND A VEHICLE

(75) Inventors: Eric Zunino, Salon de Provence (FR); Matthias Harer, Allemagne (DE)

(73) Assignee: Airbus Helicopters, Marignane Cedex (FR)

( * ) Notice: Subject to any disclaimer, the term of this patent is extended or adjusted under 35 U.S.C. 154(b) by 131 days.

(21) Appl. No.: 13/371,644

(22) Filed: Feb. 13, 2012

(65) Prior Publication Data
US 2012/0217368 A1  Aug. 30, 2012

(30) Foreign Application Priority Data

Feb. 28, 2011  (FR) ...................... 11 00590

(51) Int. Cl.
| | |
|---|---|
| F16M 13/00 | (2006.01) |
| B60N 2/015 | (2006.01) |
| A47B 97/00 | (2006.01) |
| B61D 45/00 | (2006.01) |
| B65D 63/00 | (2006.01) |
| B64C 1/20 | (2006.01) |
| B64C 1/22 | (2006.01) |
| B64D 47/00 | (2006.01) |
| B64D 13/00 | (2006.01) |
| B64D 11/06 | (2006.01) |

(52) U.S. Cl.
CPC ........ B64D 11/0696 (2013.01); B60N 2/01575 (2013.01); B64D 2011/0644 (2013.01); B64C 1/20 (2013.01)
USPC ........ 248/429; 248/424; 248/503.1; 410/102; 410/104; 410/105; 244/118.1; 244/118.6

(58) Field of Classification Search
USPC ................... 248/550, 424, 429, 176.3, 188.1, 248/221.11, 222.12, 503.1; 410/105, 102, 410/104
See application file for complete search history.

(56) References Cited

U.S. PATENT DOCUMENTS

| | | | |
|---|---|---|---|
| 3,377,040 A | 4/1968 | Hansen | |
| 4,062,298 A | 12/1977 | Weik | |
| 7,641,426 B2 * | 1/2010 | Stubbe | 410/105 |
| 2009/0200847 A1 * | 8/2009 | Scheck et al. | 297/284.8 |

FOREIGN PATENT DOCUMENTS

| | | |
|---|---|---|
| EP | 1342662 A1 | 9/2003 |
| EP | 1762490 A1 | 3/2007 |

(Continued)

OTHER PUBLICATIONS

Search Report and Written Opinion; FR 1100590; dated Oct. 5, 2011.

*Primary Examiner* — Jonathan Liu
*Assistant Examiner* — Taylor Morris
(74) *Attorney, Agent, or Firm* — Brooks Kushman P.C.

(57) ABSTRACT

A fastener device (10) for fastening a load to a rail (4) that is provided with a slideway (4') defined by a bottom wall (5), two side walls (6), and a top wall (7) including a succession of wide slots (8) and of narrow slots (9), said fastener device (10) comprising a base (20) and two shoes (30) suitable for being inserted in said wide slots (8) and for co-operating with the top wall (7) in a narrow slot (9) by shape interference. The device further comprises first and second slides (31, 32), each including one of said two shoes (30), spacer means (40) for spacing apart said first and second slides (31, 32), detector means (50) for detecting a rail (4'), approach means (60) for causing said first and second slides (31, 32) to approach each other, and blocking means (70) for longitudinally blocking said base (20).

19 Claims, 3 Drawing Sheets

(56) References Cited

FOREIGN PATENT DOCUMENTS

| | | | |
|---|---|---|---|
| EP | 2353926 A1 | 8/2011 | |
| FR | 2817596 A1 | 6/2002 | |
| FR | 2930202 A1 | 10/2009 | |
| GB | 2406877 A | 4/2005 | |
| WO | WO 2005/039920 A1 * | 5/2005 | ............. B60N 2/015 |

* cited by examiner

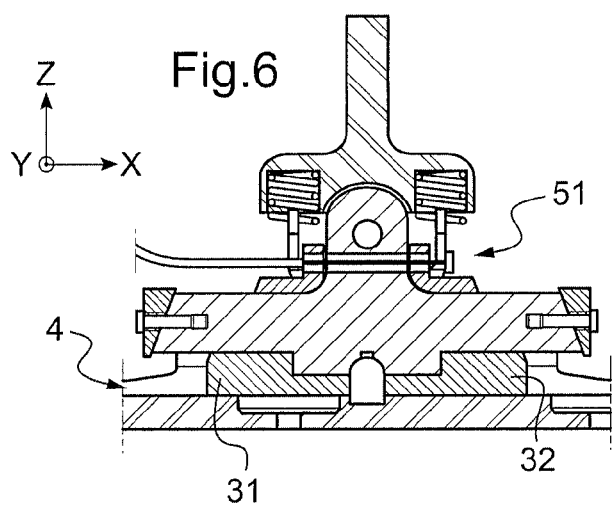
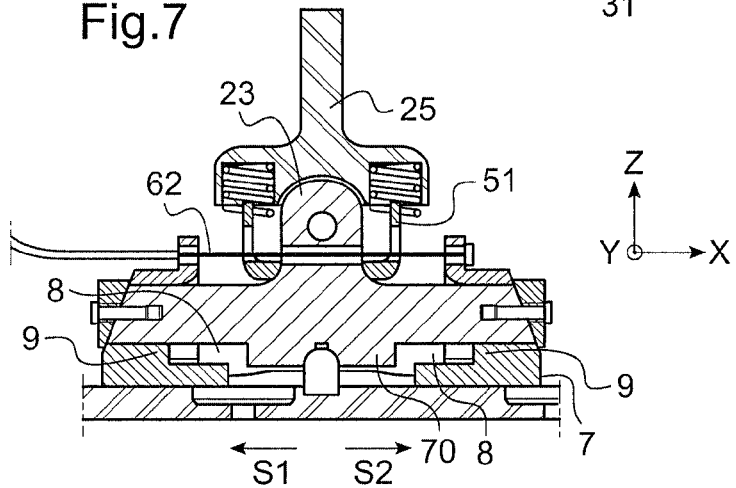
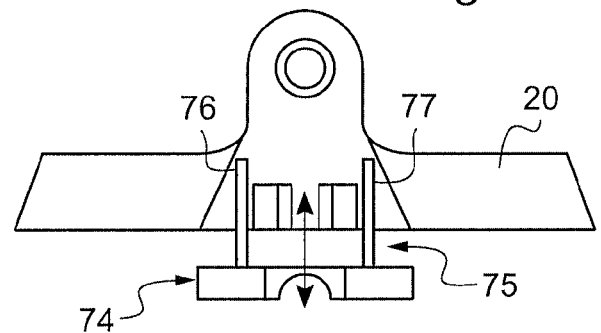
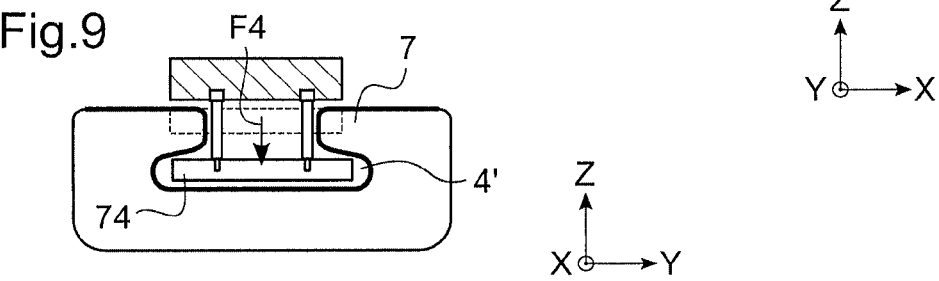

FASTENER DEVICE, A SEAT PROVIDED WITH SAID DEVICE, AND A VEHICLE

CROSS REFERENCE TO RELATED APPLICATIONS

This application claims priority to FR 11 00590 filed on Feb. 28, 2011, the disclosure of which is incorporated in its entirety by reference herein.

BACKGROUND OF THE INVENTION (1) Field of the Invention

The present invention relates to a fastener device, to a seat provided with said fastener device, and to a vehicle.

The invention lies in particular in the technical field of devices for fastening a load to a floor, and more particularly to devices for fastening a load such as a seat to a rail in an aircraft.

(2) Description of Related Art

The term "load" is used to mean any element that is suitable for being attached releasably to a structure.

A seat may be attached to the structure of an aircraft via a fastener device that co-operates with one or more rails.

For example, the rails used in the field of aviation are often of C-shaped section. Such a rail has a bottom wall and two side walls that are extended by rims in order to define a slideway. The rims together constitute a top wall of the rail that presents a succession of wide slots of generally cylindrical shape and of narrow slots of generally rectangular shape.

In order to attach a load to a rail, use is then made of fastener devices that co-operate with the rail.

Document U.S. Pat. No. 4,062,298 describes a fastener device having shoes suitable for being inserted in the wide slots of the rail in order to reach the slideway. The shoes are then moved relative to the slideway in order to bring them into coincidence with the narrow slots, and then a screw is turned to control a blocking finger. Under such circumstances, the fastener device is secured to the rail along an elevation axis of the rail by shape interference between the shoe and the rims defining the narrow slots.

Document U.S. Pat. No. 3,377,040 describes a rail arranged on an I-section beam co-operating with a fastener device.

The fastener device comprises a frame carrying two latches pivoting about respective pins. Each latch has two shoes and a locking finger co-operating with a lever to be moved in an elevation direction.

Document EP 1 762 490 describes a fastener device having a base provided with means for connection to a seat, the base co-operating with a single slide carrying shoes. The fastener device further includes an operating lever hinged to the base and the slide in order to move the slide from an opening position to a blocking position. In addition, locking means serve to lock the operating lever in a closing position.

It should also be observed that the technological background includes in particular documents FR 2 930 202 and FR 2 817 596.

For example, document FR 2 930 202 describes an anchoring mechanism co-operating with a rail having anchoring wires.

Document FR 2 817 596 describes a ball fastener system for fastening a support to a floor.

Document GB 2 406 877 describes a device for fastening a load to a rail having a base and two slides carrying shoes. The slides are movable in opposite directions.

Document EP 2 353 926 describes a fastener device having an elongate body with a non-movable portion and a movable portion.

Document EP 1 342 662 proposes a fastener device having a movable part that slides relative to a stationary part and a blocking knob that locks a stud in a rail.

It will be understood that it can be difficult for a non-qualified individual, such as a passenger sitting on a seat in an aircraft, to operate an unknown fastener device.

BRIEF SUMMARY OF THE INVENTION

Under such circumstances, the present invention seeks to propose a fastener device that enables a non-qualified individual to fasten a load to a rail, e.g. fasten a seat so that the occupant of the seat can move it from a first position to a second position in order to improve the occupant's comfort.

According to the invention, a fastener device for fastening a load to a rail that is provided with a slideway defined by a bottom wall, two side walls, and a top wall including a succession of wide slots and narrow slots, itself comprises a base and two shoes suitable for being inserted in said wide slots in order to reach the slideway and to co-operate with the top wall in a narrow slot by shape interference so as to block the fastener device in an elevation direction.

The fastener device is remarkable in particular in that it further comprises:

first and second slides that are arranged respectively on first and second slide shafts of said base, each slide having one of the two shoes for blocking the device in elevation by shape interference with the top wall;

spacer means for spacing the first and second slides to move the first and second slides longitudinally in opposite directions;

detector means for detecting a rail and automatically controlling the spacer means to move each slide from an opening position in which a wide slot is in register with the slide to a locking position in which a narrow slot is in register with the slide;

approach means for approaching the first and second slides to move each slide from a locking position to an opening position; and blocking means for longitudinally blocking said base.

Thus, the fastener device is in an opening position prior to being inserted in the rail. The fastener device is presented in this configuration to the rail with the shoes facing wide slots, e.g. two adjacent wide slots that are spaced apart by a narrow slot.

Thereafter, the fastener device is pushed into the rail in an elevation direction, with each shoe penetrating into the slideway of the rail through a wide slot. Once the rail detector means detect that this insertion has taken place, e.g. by shape interference with the top wall, the detector means enable the spacer means to move the first and second slides, and thus the shoes, automatically, i.e. without human intervention. A narrow slot is then in register with each of the shoes. The fastener device is thus blocked in the elevation direction by shape interference between each shoe and a portion of the top wall defining a narrow slot, more precisely with the inside face of the top wall facing the slideway.

It should be observed that this blocking does not require the shoes to be moved manually.

In addition, since each shoe is then located in the slideway of the rail, the fastener device is also blocked in a transverse direction by the side walls of the rail.

Finally, blocking means of the base block the fastener device in a longitudinal direction.

Consequently, the fastener device co-operates automatically with the rail, without requiring intervention from an operator. It suffices to push the fastener device in order to insert the shoes in the slideway of the rail in order to secure it to the rail.

Conversely, in order to remove the fastener device, the approach means are operated to position the first and second slides in an opening position. By pulling on the fastener device, the fastener device can then be separated from the rail without effort.

The device may include one or more of the following characteristics, depending on the variant.

For example, the spacer means may comprise resilient means interposed between the first slide and the second slide. In one embodiment, the resilient means comprise two springs arranged transversely on either side of the support. Nevertheless, other resilient means can be envisaged.

In another aspect, the approach means optionally comprise a sheath bearing against a first stop surface of the first slide and a cable passing along the sheath and having an end stop in contact against a second stop surface of the second slide, the cable being connected to an actuator.

By pulling on the cable with an actuator, the first and second slides are moved towards each other. The actuator may be a handle that is easily operated by a non-qualified individual.

Furthermore, in a first variant, the blocking means comprise a soleplate secured to the base. The soleplate includes two blocking elements engaged in the top wall through adjacent wide slots when the fastener device is arranged on the rail, the soleplate optionally having connection means shaped to the shape of the narrow slots between the two blocking elements.

In a second variant, the blocking means comprise a soleplate, e.g. of the above-described type, fastened to the base by means providing freedom to move in elevation, e.g. in the form of two pins passing through orifices in elevation in the support.

Thus, when the fastener device is secured to the rail in an elevation direction, it remains possible to move the fastener device longitudinally. By pushing the soleplate into the slideway, the soleplate is disengaged from the top wall. It is then possible to move the fastener device.

Independently of the variant, the soleplate may include damper means in order to avoid transmitting vibration from the rail to the fastener device, e.g. it may include a block of elastomer arranged between two blocking elements of the soleplate.

Furthermore, the detector means may comprise a movable member that is movable in elevation and that is provided with at least one detector finger and also firstly with a first bridge in register with the first slide shaft that is suitable for blocking the first slide in the opening position by shape interference, and secondly a second bridge in register with the second slide shaft and suitable for blocking the second slide in the opening position by shape interference.

Thus, when the detector finger touches the top wall of the rail, the shoes of the first and second slides have been inserted in the slideway. Contact between the rail and the detector finger causes the movable member to move in translation relative to the support.

Thereafter, each bridge releases the associated slide. As a result, the first and second slides move automatically in opposite directions under drive from the spacer means under the control of the detector means.

It should be observed that the term "bridge" is used to mean a U-shaped metal part with the concave side of each bridge being placed astride the associated slide shaft.

In an embodiment, the first bridge is connected to the second bridge by two longitudinal side strips, the detector finger projecting in the elevation direction from a side strip and co-operating with a guide of the base.

In another aspect, the detector means comprise at least one resilient member co-operating with the movable member tending to cause each bridge to approach a respective one of the slide shafts.

Such a resilient member may be interposed between the movable member and a support member secured to the base.

The support member may be a portion of the base or an adapter fastened to the base.

Furthermore, each slide shaft may include stop means for stopping the associated slide.

In addition, the fastener device optionally includes guide means for guiding the base and suitable for being fastened to the rail in order to move the base from a first fastener zone to a second fastener zone, such as guide means provided with arms fastened to the rail and hinged to the base. It should be observed that the guide means may present blocking means for blocking the fastener device longitudinally.

It can be understood that the fastener device may enable any type of load to be anchored to a rail, and more particularly a seat.

The invention then provides more particularly a seat provided with a leg including a fastener device of the above-described type.

Furthermore, the invention provides a vehicle including a seat fastened to a rail by at least one fastener device of the above-described type.

BRIEF DESCRIPTION OF THE SEVERAL VIEWS OF THE DRAWINGS

The invention and its advantages appear in greater detail from the context of the following description of embodiments given by way of illustration with reference to the accompanying figures, in which:

FIGS. 5 to 7 are sections for explaining the operation of the invention; and

FIGS. 8 and 9 are views showing a variant of the invention.

Elements that are present in more than one of the figures are given the same references in each of them.

Three mutually orthogonal directions X, Y, and Z are shown in some of the figures.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "elevation" relates to any direction parallel to the third direction Z.

DETAILED DESCRIPTION OF THE INVENTION

Figure 1:
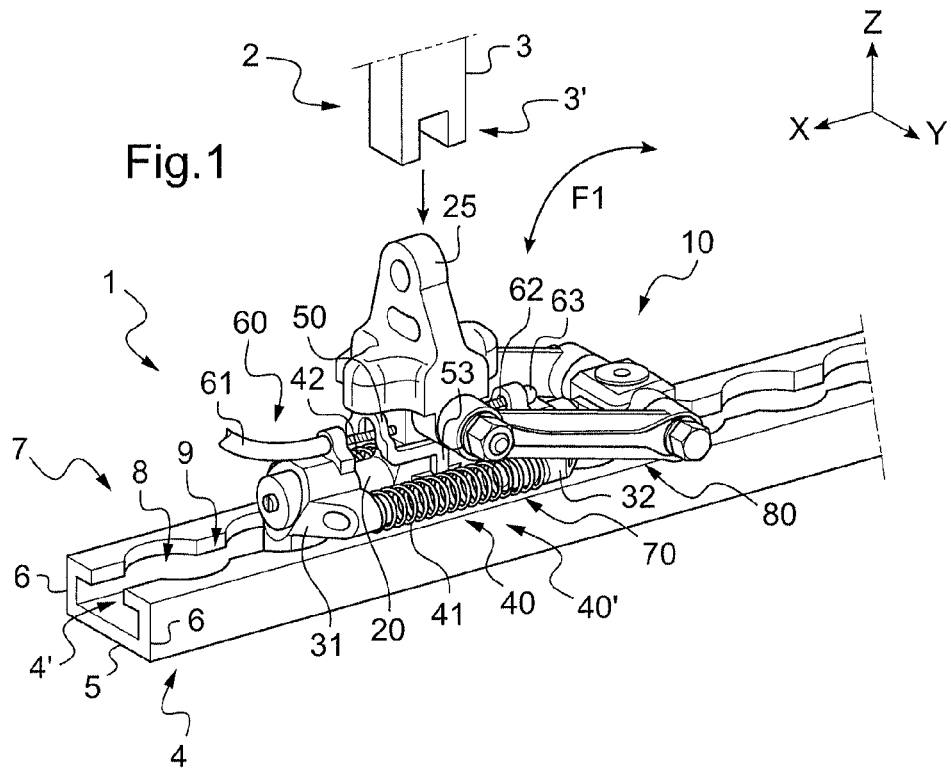
FIG. 1 is an isometric view of a vehicle of the invention.

FIG. 1 shows a vehicle 1 provided with a seat 2, the seat 2 including at least one leg 3. The vehicle and the seat 2 are not shown in full in order to simplify the figure and in order to avoid overcrowding it with details that do not necessarily relate to the invention.

The leg 3 includes fastener means 3', e.g. a fork, for fastening to a fastener assembly comprising a rail 4 co-operating with a fastener device 10.

The rail 4 is a rail of the kind used in particular in the context of aircraft type vehicles. This rail thus includes a slideway 4' defined by a bottom wall 5 extending longitudinally and transversely, two side walls 6 extending longitudinally and in elevation, and a top wall 7 extending longitudinally and transversely.

In order to enable the fastener device 10 to be inserted in the slideway 4', the top wall 7 includes a succession of wide slots 8, e.g. in the form of circular-based cylinders, and of narrow slots 9, e.g. of rectangular shape, a narrow slot being arranged between two adjacent wide slots.

The fastener device 10 of the invention allowing a load, such as the leg 3 of a seat, to be fastened to the rail 4 then comprises a base 20. The base 20 carries a first slide 31 and a second slide 32 suitable for sliding longitudinally respectively along a first slide shaft and along a second slide shaft of the base 20. Each slide then possesses a respective shoe (not shown in FIG. 1) having a shape that matches the wide slots 8, for example, so that each shoe can firstly pass through a wide slot 8, and can secondly co-operate by shape interference with the top wall of a narrow slot 9 so as to block the fastener device in elevation within the rail 4.

Furthermore, the fastener device 10 includes spacer means 40 for moving the first slide 31 and the second slide 32 in mutually opposite directions from an opening position in which a wide slot 8 is in register with each of the slides 31 and 32, to a locking position in which a narrow slot 9 is in register with each slide 31, 32. The spacer means 40 may include resilient means 40' having two springs 41 and 42, each secured both to the first slide 31 and to the second slide 32, these springs extending longitudinally and being arranged transversely on either side of the base 20.

The spacer means 40 are also controlled automatically, i.e. they are put into action by detector means 50 for detecting the rail 4.

When the fastener device is away from the rail 4, the first and second slides 31 and 32 are in the opening position. However, when the shoes of the first and second slides 31 and 32 are arranged inside the slideway 4', the detector means detect the rail 4 and in particular its top wall 7. Consequently, the detector means 50 release the first and second slides 31 and 32 so that the spacer means 40 place the first and second slides 31 and 32 in their locking position.

The detector means 50 may optionally be provided with a movable member 51 suitable for being engaged temporarily with the first and second slides 31 and 32 in order to block them in their opening position. The movable member 51 may then comprise a detector finger 53 requiring the movable member 51 to move in translation relative to the base on making contact with the top wall 7. The movable member 51 may co-operate with a resilient member (not shown in FIG. 1), the resilient member being interposed between said movable member 51 and a support member 25 secured to the base 20.

The support member may also include a hinge for fastening to the load fitted with the fastener device 10, specifically the leg 3 of a seat in the example shown.

Conversely, in order to enable the fastener device 10 to be separated from the rail 4, the fastener device 10 is provided with approach means 60 for moving the first and second slides 31 and 32 towards each other. These approach means may include a sheath 61 and a cable 62 having an end stop 63.

By pulling on the cable 62, the first and second slides 31 and 32 are caused to move from their locking position towards their opening position.

Furthermore, it can be understood that the shoes of the first and second slides 31 and 32 serve firstly to block the fastener device 10 in the rail 4 in an elevation direction Z by shape interference with the top wall 7, and also to block them in a transverse direction Y by being held between the two side walls 6 of the rail 4.

Under such circumstances, in order to enable the fastener device 10 to be blocked in the rail 4 in a longitudinal direction X, the fastener device includes longitudinal blocking means 70.

The blocking means 70 may include a soleplate (not shown in FIG. 1) or guide means 80 for guiding the base 20. By way of example, such guide means 80 comprise two arms hinged to the base 20 and to a fastener peg of the rail 4.

The guide means thus block the fastener device longitudinally when the shoes are in the locked position. In contrast, when the shoes are in the opening position, the guide means enable the fastener device to be guided in pivoting along arrow F1 from a first position on the rail 4 to a second position.

Figure 2:
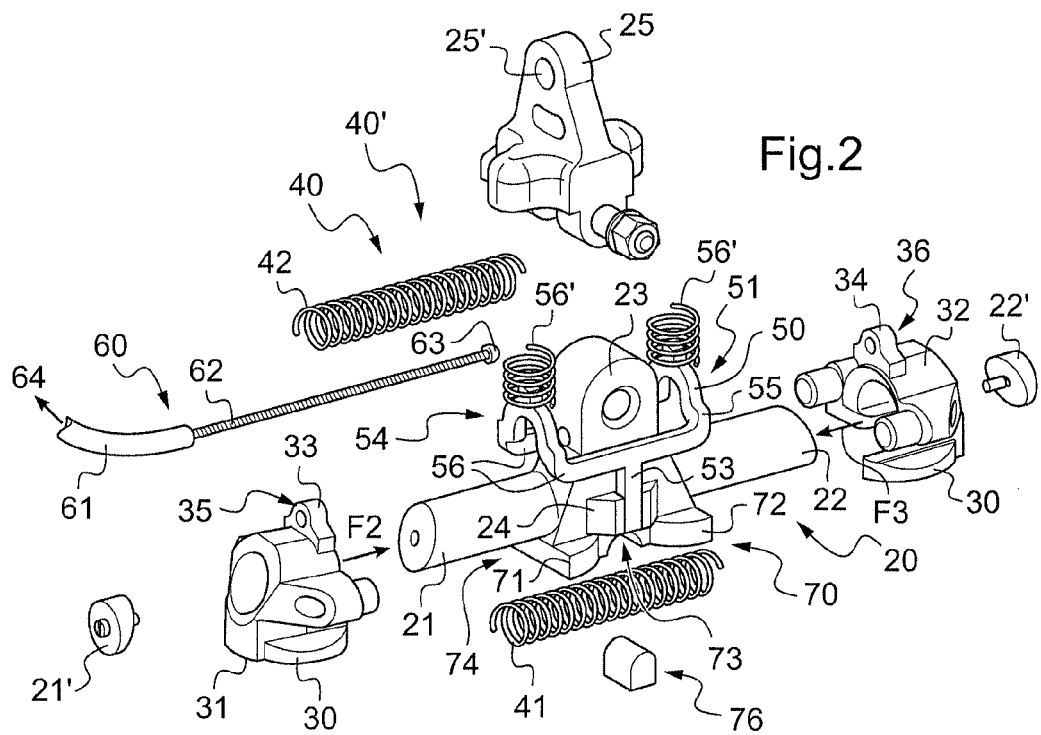
FIG. 2 is an exploded view showing a fastener device.

FIG. 2 is an exploded view showing a fastener device in a preferred embodiment.

The base 20 of the fastener device 10 includes a central body 23. A first slide shaft 21 and a second slide shaft 22 extend longitudinally in two opposite directions from the body 23.

Under such circumstances, a first slide 31 provided with a shoe 30 is engaged on the first slide shaft 21, first stop means 21' being screwed to the free end of the first slide shaft 21 to hold the first slide 31 on the first slide shaft 21. Likewise, a second slide 32 provided with a shoe 30 is engaged on the second slide shaft 22, second stop means 22' being screwed to the free end of the second slide shaft 22 in order to hold the second slide 32 on the second slide shaft 22. Each shoe matches the shape of a wide slot so as to make it possible firstly to pass through a wide slot and secondly to be incapable of passing through a narrow slot.

Each slide may thus move longitudinally on the associated slide shaft from one extreme position referred to as an opening position close to the body 23, to another extreme position referred to as a locking position against the associated stop means.

Furthermore, spacer means 40 comprise resilient means 40' interposed between the first slide 31 and the second slide 32. By way of example, the resilient means possess two springs 41 and 42, each spring being engaged on the first slide 31 and the second slide 32.

In order to enable the first and second slides 31 and 32 to move from the opening position to the locking position under predetermined conditions, i.e. when the shoes are in the slideway of a rail, the fastener device 1 includes detector means 50.

The detector means 50 include a movable member 51 provided with at least one detector finger 53 that co-operates with a guide 24 of the central body 23 of the base 20.

Furthermore, the detector finger 53 co-operates with first and second bridges 54 and 55 located astride the movable member 51. Each bridge 54, 55 presents a curved portion connected to two side branches.

The movable member 51 is provided with a first bridge 54 extending in elevation astride the first slide shaft 21 and a second bridge extending in elevation astride the second slide shaft 22, the side branches of the first bridge 54 and of the second bridge 55 being connected together by side strips 56 extending longitudinally.

Thus, the movable member advantageously has two detector fingers 53 extending in elevation from each side strip 56 on either side of the body 23.

Figure 3:
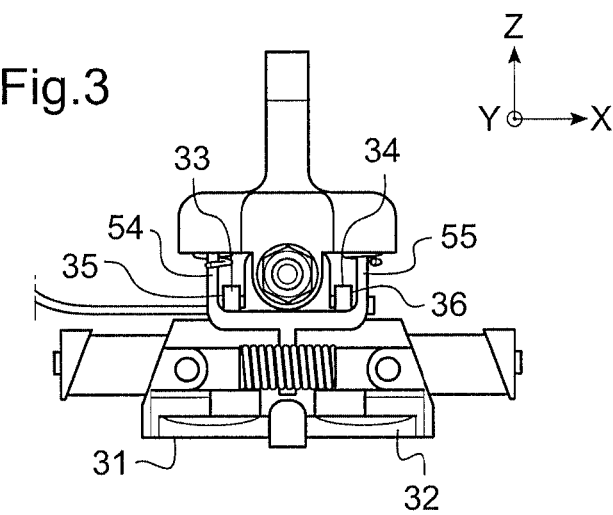
FIGS. 3 and 4 are views showing the fastener device in a locked position and in an opening position.

With reference to FIG. 3, in a position of low elevation, the first bridge 54 can then block a first stop surface 35 of a first protuberance in elevation 33 of the first slide 31 and the second bridge 55 can block a second stop surface 36 of a second protuberance in elevation 34 of the second slide 32, with the shapes of the bridges interfering with the shapes of the corresponding stop surfaces. The first and second slides 31 and 32 in an opening position may either be inserted in a rail or extracted from a rail.

Figure 4:
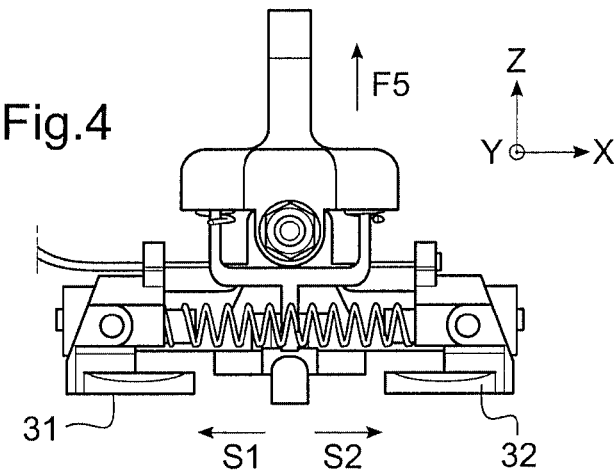

In contrast, and with reference to FIG. 4, while the fastener device is being inserted in a rail, as the fastener device penetrates therein, the detector finger comes into contact with the top wall of the rail. As a result, the movable member moves in translation relative to the base from a low elevation position towards a high elevation position along arrow F5. This movement in translation serves to release the first and second slides 31 and 32, which then move in opposite directions S1 and S2.

Under such circumstances, the detector means 50 possess a resilient member 56' tending to hold the movable member in its low elevation position while the fastener device is in its opening position.

This resilient member 56' is interposed between the movable member 51 and an element that is secured to the body 23, such as a support member 25 capable of being fastened to the body 23 by conventional means. For example, the resilient member 56' includes two springs connecting the curved portions of each of the bridges 54, 55 to the support member 25.

It should be observed that this support member may include connection means 25' for connecting to the load that is to be fastened to a rail.

Furthermore, the fastener device 10 has approach means 60 provided with a sheath 61 in contact with the first stop surface of the first slide 31.

Furthermore, the approach means include a cable running along the sheath 61, the first protuberance 33, the body 23, and then the second protuberance 34. An end stop 63 of the cable 62 is then in contact with the second stop surface 36. The cable can be driven by drive means 64.

If a load has a plurality of fastener devices, all of the cables are advantageously connected to common drive means.

In another aspect, longitudinal blocking means 70 include a soleplate 74.

The soleplate 74 has two blocking elements 71 and 72 suitable for being engaged in the top wall of a rail in two adjacent wide slots when the fastener device is arranged on the rail. Furthermore, the soleplate includes connection means 73 matching the shape of the narrow slots between the two blocking elements.

As shown in FIG. 2, the soleplate 74 may be secured to the base in the longitudinal, transverse, and elevation directions.

In contrast, in the variant shown in FIG. 8, the soleplate 74 is fastened to the base 20 by means 75 allowing it freedom to move in elevation. These means allowing freedom to move may comprise two pins 76 and 77 co-operating with two orifices in the base 20, and they may be controlled by an electric motor or manually, for example.

With reference to FIG. 9, in order to move the fastener device 10 longitudinally, the soleplate 74 is pushed into the slideway 4' along arrow F4. The soleplate then no longer blocks the fastener device 10 by its shape interfering with the shape of the top wall 7.

It is then possible to cause the fastener device to slide in order to select its position freely.

With reference to FIG. 2, the soleplate 74 is fitted with damper means 76, the damper means 76 being suitable for being clamped between the connection means 72 of the soleplate and the bottom wall 5 of a rail, for example.

Figure 5:
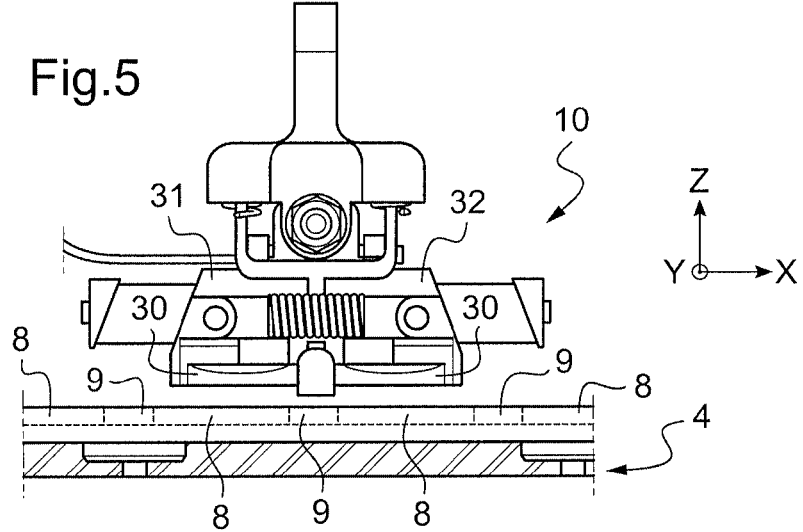

FIGS. 5 to 7 explain the operation of the fastener device 10.

With reference to FIG. 5, while outside the rail 4, the fastener device 10 is in an opening position. The distance between the first shoe 30 of the first slide 31 and the second shoe 30 of the second slide 32 is at a minimum, this distance being substantially equal to the length of a narrow slot 9.

With reference to FIG. 6, the fastener device is then inserted in the rail 4, with the shoes of the first and second slides 31 and 32 penetrating into the rail 4 via two adjacent wide slots 8.

As the fastener device 10 is pushed down, the detector fingers of the movable member come into contact with the top wall of the rail 4. The movable member then moves in translation in elevation relative to the base 20.

With reference to FIG. 7, starting from a given amount of movement, the movable member 51 no longer holds the first and second slides 31 and 32, which then move apart along arrows S1 and S2.

The shoes of the first and second slides 31 and 32 are no longer in register with wide slots, but are now in register with narrow slots. The fastener device is in a locked position, with the fastener device then being blocked in elevation.

It should be observed that the soleplate 74 blocks the fastener device longitudinally by co-operating with the top wall 7.

In order to disconnect the fastener device 10 from the rail 4, the first and second slides 31 and 32 are moved towards the body 23 by using the cable 62 so as to return to the opening position shown in FIG. 6.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

In particular, FIG. 1 suggests using fastener devices for fastening a seat to a rail. Nevertheless, the fastener device may be used for stowing a variety of loads, e.g. freight.

What is claimed is:

1. A fastener device for fastening a load to a rail provided with a slideway that is defined by a bottom wall, two side walls, and a top wall including a succession of wide slots and of narrow slots, said fastener device comprising a base and two shoes suitable for being inserted in said wide slots and for co-operating with the top wall by shape interference in a narrow slot, said fastener device having:

first and second slides, each slide having one of said two shoes for blocking said fastener device in elevation by shape interference with said top wall; and spacer means for spacing said first and second slides to move said first and second slides longitudinally in opposite directions;

wherein the fastener device further comprises:

a first slide shaft and a second slide shaft of said base, the first and second slides being arranged respectively on the first and second slide shafts of said base;

detector means for detecting a rail and automatically controlling the spacer means to move each slide from an opening position in which a wide slot is in register with said slide to a locking position in which a narrow slot is in register with said slide;

approach means for approaching said first and second slides to move each slide from the locking position towards the opening position; and blocking means for longitudinally blocking said base.

2. A fastener device according to claim 1, wherein said spacer means are resilient means interposed between the first slide and the second slide.

3. A device according to claim 1, wherein said approach means comprise a sheath bearing against a first stop surface of the first slide and a cable passing along said sheath and having an end stop in contact against a second stop surface of the second slide, said cable being connected to an actuator.

4. A fastener device according to claim 1, wherein said blocking means comprise a soleplate secured to said base.

5. A fastener device according to claim 1, wherein said blocking means comprise a soleplate fastened to said base via means providing freedom to move in elevation.

6. A fastener device according to claim 4, wherein said soleplate includes damper means.

7. A fastener device according to claim 1, wherein said detector means comprise a movable member that is movable in elevation and that is provided with at least one detector finger and also firstly with a first bridge in register with the first slide shaft that is suitable for blocking the first slide in the opening position by shape interference, and secondly a second bridge in register with the second slide shaft and suitable for blocking the second slide in said opening position by shape interference.

8. A fastener device according to claim 7, wherein said first bridge is connected to the second bridge by two longitudinal side strips, said detector finger projecting in the elevation direction from a side strip and co-operating with a guide of said base.

9. A fastener device according to claim 7, wherein said detector means comprise at least one resilient member co-operating with said movable member tending to cause each bridge to approach a respective one of said slide shafts.

10. A fastener device according to claim 9, wherein said resilient member is interposed between said movable member and a support member secured to the base.

11. A fastener device according to claim 1, wherein each slide shaft includes stop means for stopping the associated slide.

12. A fastener device according to claim 1, including guide means for guiding the base and suitable for being fastened to the rail to move said base from a first fastening zone to a second fastening zone.

13. A seat provided with at least one leg, and wherein said leg includes a fastener device according to claim 1.

14. A vehicle, including a seat fastened to a rail by at least one fastener device according to claim 1.

15. A fastener device according to claim 1 wherein the slideway of the rail extends along a longitudinal axis;

wherein the first slide shaft and the second slide shaft extend outwardly from the base along the longitudinal axis;

wherein the first slide is supported by the first slide shaft to slide longitudinally thereon; and wherein the second slide is supported by the second slide shaft to slide longitudinally thereon.

16. A fastener device for fastening a load to a rail having a slideway extending along a longitudinal axis that is defined by a bottom wall, two side walls, and a top wall including a succession of wide slots and of narrow slots, said fastener device comprising:

a base having a central body supporting a first slide shaft and a second slide shaft opposed to the first slide shaft, each slide shaft extending outwardly from the central body along the longitudinal axis;

a first slide supported by the first slide shaft to slide longitudinally thereon, the first slide having a first shoe;

a second slide supported by the second slide shaft to slide longitudinally thereon, the second slide having a second shoe, wherein the first and second slides are moveable between (i) an opening position adjacent to the central body and in register with wide slots and (ii) a locking position spaced apart from the central body and in register with narrow slots, wherein the first and second shoes are sized for insertion into said wide slots and for cooperation with the top wall by shape interference in the narrow slots, each shoe adapted to block the fastener device in elevation by shape interference with the top wall;

a spacer mechanism having at least one spring extending longitudinally from the first slide to the second slide and configured to bias the first and second slides apart from one another and away from the central body; and a detector mechanism supported by the base for motion with respect to the base along a vertical axis generally perpendicular to the longitudinal axis, the detector mechanism having a moveable member with a first and second bridge and at least one finger extending along the vertical axis, wherein the first bridge is configured to contact the first slide and the second bridge is configured to contact the second slide to retain the slides in the opening position, wherein the at least one contact finger is configured to move the moveable member in response to contacting the top wall such that the first and second bridges move away from the first and second slides to automatically release the slides to the locking position.

17. The fastener device of claim 16 wherein the detector mechanism further comprises a resilient member configured to bias the moveable member towards the first and second slide shafts.

18. The fastener device of claim 16 further comprising a release mechanism having a cable and a sheath, an end of the sheath in contact with the first slide and an end of the cable connected to the second slide, wherein the cable is configured to move the slides from the locking position to the opening position.

19. The fastener device of claim 16 further comprising a soleplate supported by the central body of the base and moveable relative to the base along the vertical axis, the soleplate having blocking elements positioned on either side of a connector element, wherein the blocking elements are sized to be received by wide slots and the connector element is sized to be received by one of the narrow slots, the sole plate configured to interact with the top wall to block the fastener device in a first position, and configured to slide within the slideway in a second position such that the fastener device moves longitudinally with respect to the slideway, the second position space apart vertically from the first position.

* * * * *